United States Patent
Haque et al.

(10) Patent No.: US 9,290,389 B2
(45) Date of Patent: Mar. 22, 2016

(54) GRAPHENE COMPOSITE AND A METHOD OF MANUFACTURING A GRAPHENE COMPOSITE

(75) Inventors: Samiul Md Haque, Cambridge (GB); Richard White, Huntingdon (GB); Chris Bower, Cambridgeshire (GB)

(73) Assignee: Nokia Corporation, Espoo (FI)

(*) Notice: Subject to any disclaimer, the term of this patent is extended or adjusted under 35 U.S.C. 154(b) by 1099 days.

(21) Appl. No.: 13/314,351

(22) Filed: Dec. 8, 2011

(65) Prior Publication Data
US 2013/0149554 A1    Jun. 13, 2013

(51) Int. Cl.
| B29C 65/52 | (2006.01) |
| B32B 37/12 | (2006.01) |
| B32B 38/10 | (2006.01) |
| B32B 43/00 | (2006.01) |
| C01B 31/04 | (2006.01) |
| B82Y 30/00 | (2011.01) |
| B82Y 40/00 | (2011.01) |

(52) U.S. Cl.
CPC ............ *C01B 31/0453* (2013.01); *B82Y 30/00* (2013.01); *B82Y 40/00* (2013.01)

(58) Field of Classification Search
USPC .......... 156/230, 233, 235, 238, 241, 247, 249
See application file for complete search history.

(56) References Cited

U.S. PATENT DOCUMENTS

| 2010/0326645 A1 | 12/2010 | Fan et al. ................ 165/185 |
| 2011/0100951 A1 | 5/2011 | Juang et al. ............... 216/13 |
| 2011/0123776 A1 | 5/2011 | Shin et al. ................ 428/172 |

FOREIGN PATENT DOCUMENTS

| EP | 2267761 A2 | 12/2010 |
| JP | 2012224485 A | 11/2012 |

OTHER PUBLICATIONS

Bajpai, R. et al.; "Facile one-step transfer process of graphene"; Apr. 2011; pp. 1-5; Nanotechnology, vol. 22; IOP Publishing Ltd.
Han, G.H., et al.; "Poly(Ethylene Co-Vinyl Acetate)-Assisted One-Step Transfer of Ultra-Large Graphene"; Feb. 2011; pp. 59-65; NANO:Brief Reports and Reviews, vol. 6, No. 1; World Scientific Publishing Company.
Juang Z Y et al. *Graphene Synthesis by Chemical Vapor Deposition and Transfer by a roll-to-roll Process* Carbon, Elsevier, Oxford, GB, vol. 48, No. 11, Sep. 1, 2010, pp. 3169-3174, XP027093619.
Reeti Bajpai et al. *Facile one-step Transfer Process of Graphene; Facile one-step Transfer Process of Graphene* Nanotechnology, IOP, Bristol, GB, vol. 22, No. 22, Apr. 1, 2011, p. 225606, XP020205438.
Gang Hee Han et al. *Poly(ethylene Co-Vinyl Acetate)-Assisted One-Step Transfer of Ultra-Large Graphene*, Nano, vol. 06. No. 01, Feb. 1, 2011, pp. 59-65, XP055154735.

*Primary Examiner* — Sing P Chan
(74) *Attorney, Agent, or Firm* — Harrington & Smith

(57) ABSTRACT

A method including providing graphene on a growth substrate; providing a target substrate on the graphene to form a first composite including the target substrate and graphene; and removing at least a portion of the first composite from the growth substrate.

12 Claims, 3 Drawing Sheets

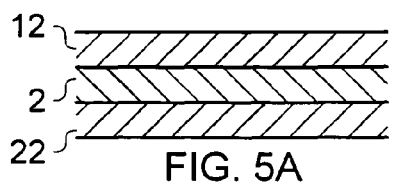
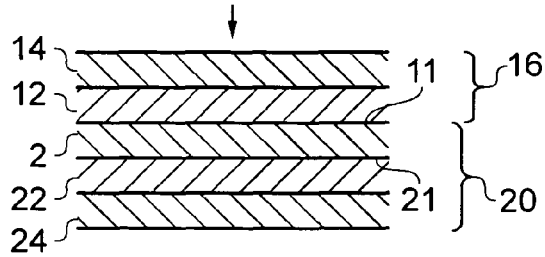
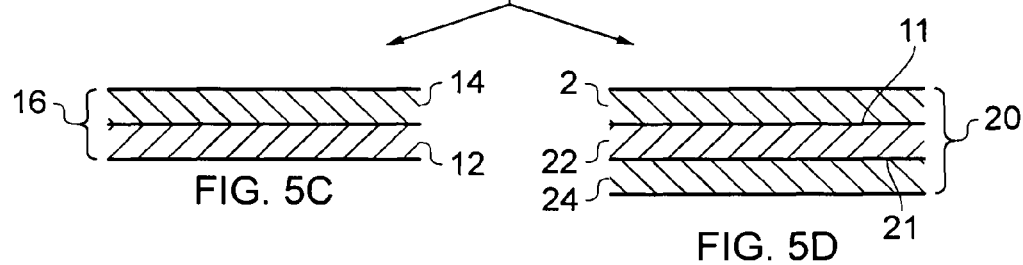
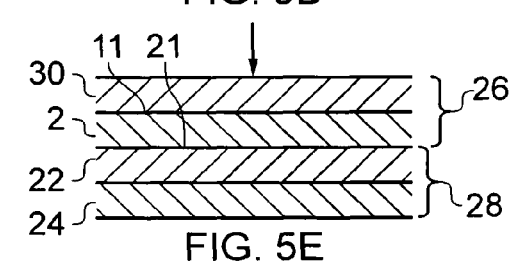
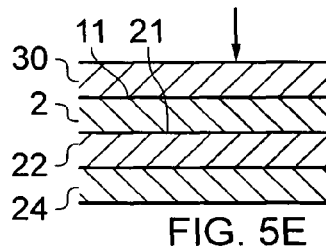
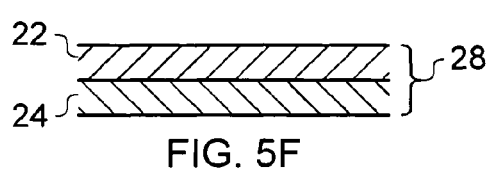
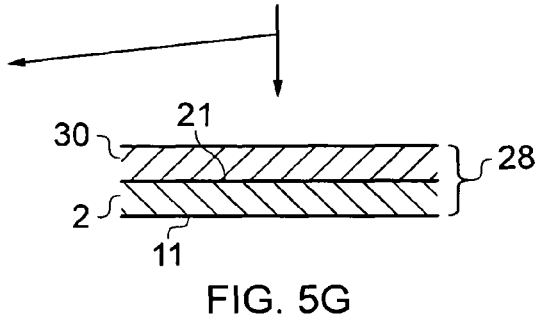

US 9,290,389 B2

GRAPHENE COMPOSITE AND A METHOD OF MANUFACTURING A GRAPHENE COMPOSITE

TECHNOLOGICAL FIELD

Embodiments of the present invention relate to a graphene composite and a method of manufacturing a graphene composite (laminate).

BACKGROUND

Graphene is a single atomic plane of graphite. Whilst it is the thinnest and strongest material available, it is generally not used in this isolated state, but rather is more commonly incorporated as a composite (laminate) comprising a substrate supporting the attached graphene. The graphene may be a monolayer, a bilayer or a multilayer of graphene. Generally to fabricate high quality, single crystalline graphene, a high temperature deposition from vapour is required, which uses metallic substrates such as copper or nickel Currently such a composite (laminate) is made by forming the graphene on a copper foil using chemical vapour deposition, applying a target substrate to the graphene and then removing the copper foil by using an etching bath.—This process is limiting since the etch solution is often a highly oxidising solution such as hydrofluoric acid (HF), which only a small number of substrates are resistant to. The composite (laminate) of graphene, comprising the target substrate and graphene, can then be used to transfer the graphene. If required, the target substrate may then be dissolved to leave only the graphene—.

BRIEF SUMMARY

According to various, but not necessarily all, embodiments of the invention there is provided a method comprising: providing graphene on a growth substrate; providing a target substrate on the graphene to form a first composite comprising the target substrate and graphene; and removing at least a portion of the first composite from the growth substrate.

According to various, but not necessarily all, embodiments of the invention there is provided a composite comprising a substrate and graphene, wherein the graphene has not been exposed to wet etching.

According to various, but not necessarily all, embodiments of the invention there is provided a flexible composite comprising a flexible substrate and graphene, wherein the graphene and flexible substrate are attached using an adhesive.

Embodiments of the invention may avoid the use of etchant baths to form graphene composites. This may result in higher quality graphene, fewer and less costly processing steps, and/or less contamination/doping of both graphene and target substrate by the etch solution.

BRIEF DESCRIPTION

Figure 1A:
Figure 1B:
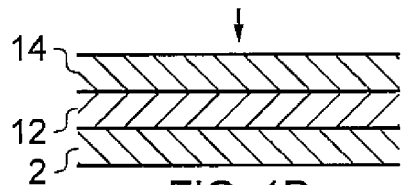
Figure 2A:
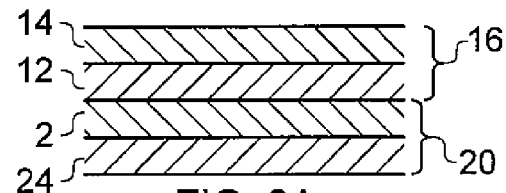
Figure 1C:
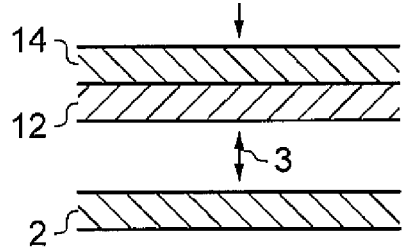
Figure 2B:
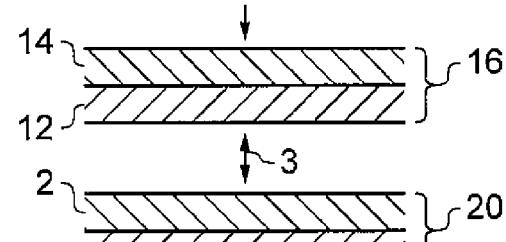
Figure 3A:
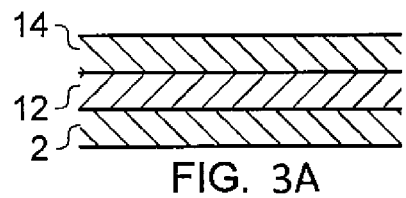
Figure 4A:
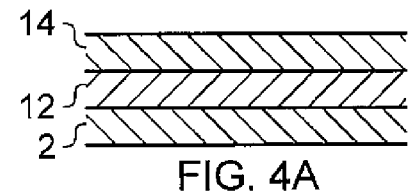
Figure 3B:
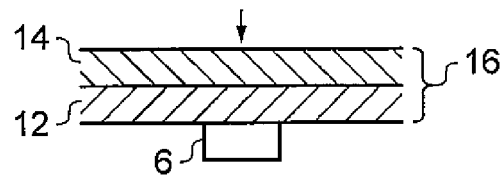
Figure 4B:
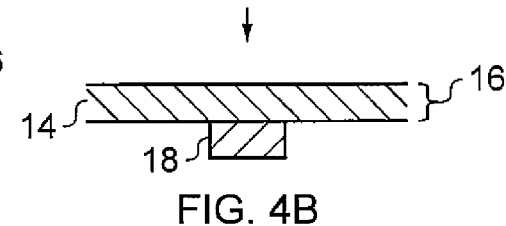
Figures 6A, 6B:
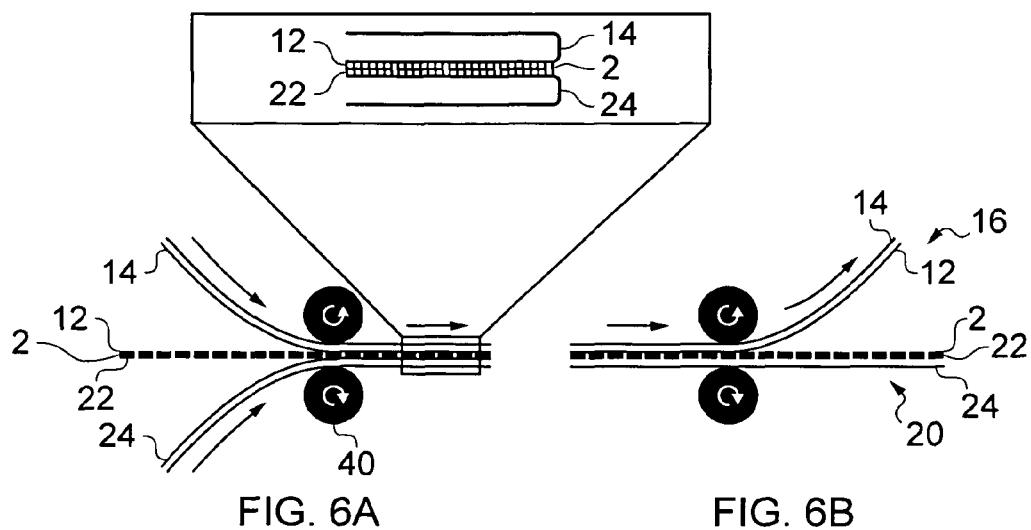
Figures 6C, 6D:
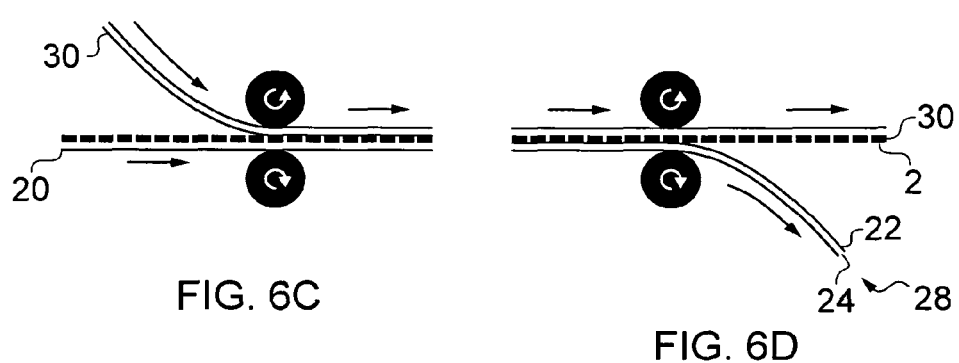
Figure 7:
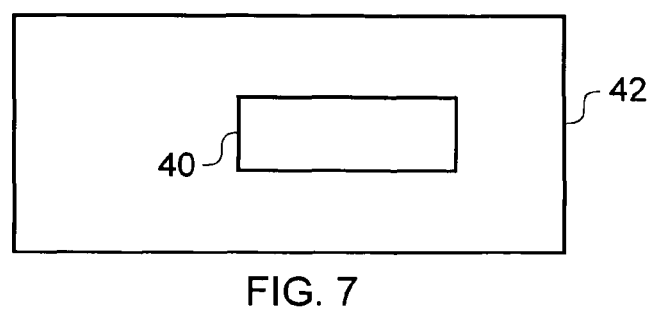

For a better understanding of various examples of embodiments of the present invention reference will now be made by way of example only to the accompanying drawings in which:

FIGS. 1A, 1B and 1C schematically illustrate a method of manufacturing a composite comprising a target substrate and graphene;

FIGS. 2A and 2B schematically illustrate a method of manufacturing a composite comprising a target substrate and graphene in which a membrane is used to facilitate separation of the graphene from the growth substrate;

FIGS. 3A and 3B schematically illustrate a method of manufacturing a composite comprising a target substrate and graphene in which a portion or portions of the growth substrate are retained on a surface of the first composite;

FIGS. 4A and 4B schematically illustrate a method of manufacturing a composite comprising a target substrate and only a portion or portions of graphene;

FIGS. 5A, 5B, 5C, 5D, 5E, 5F and 5G schematically illustrate a method of manufacturing not only a first composite comprising a first target substrate and first graphene but also a further composite comprising a second target substrate and second graphene;

FIGS. 6A, 6B, 6C and 6D illustrate a method similar to that illustrated in FIGS. 5A to 5G; and FIG. 7 illustrates that a composite may be used produce a product that is used in the manufacture of an apparatus.

DETAILED DESCRIPTION

The term 'composite' in this document means an object formed by combining distinct parts that are distinct after the combination. The parts are bonded at the interface between the parts or via an intervening medium. A 'laminate' is one specific example of a composite where the distinct parts form layers. The term 'laminate' does not necessarily imply that the layers are complete.

The Figures illustrate methods comprising: providing graphene 12 on a growth substrate 2; providing a target substrate 14 on the graphene 12 to form a first composite 16 comprising the target substrate 14 and graphene 12; and removing at least a portion of the first composite 16 from the growth substrate 2.

When a material is described as being 'on' another material, then the material may be attached directly to the other material or, alternatively, attached indirectly to the another material via one or more other materials.

FIGS. 1A, 1B and 1C schematically illustrate a method of manufacturing a composite 16 comprising a target substrate 14 and graphene 12.

Graphene 12 is provided on a growth substrate 2 (FIG. 1A).

As an example, the graphene may be provided by chemical vapour deposition. The growth substrate may be placed in a heated furnace attached to a gas delivery system. A gaseous carbon source (such as, for example, methane or acetylene) flows downstream to the growth substrate 2, which may, for example, be a transition metal foil (e.g. copper Cu, nickel Ni). The carbon is precipitated out in its lowest free energy state (graphene) during a cool down to room temperature. This process may also be carried out in a roll to roll manner by continuous deposition onto a transition metal foil.

Next, as illustrated in FIG. 1B, a target substrate 14 is provided on the graphene 12 to form a first composite 16 comprising, in combination, the target substrate 14 and graphene 12.

The target substrate 14 may be flexible, that is, bendable. The target substrate may also be elastomeric, that is, stretchable. Suitable target substrate 14 may include, but are not necessarily limited to: Polyethylene Terephthalate (PET), Polyethylene Naphthalate (PEN), Polyimide (PI), Polycarbonate (PC), Polyethylene (PE), Polyurethane (PU), Polymethylmethacrylate (PMMA), Polystyrene (PS), natural rubbers such as; Polyisoprenes, Polybutadienes, Polychloraprenes, Polyisobutylenes, Nitrile Butadienes and Styrene Butadienes, saturated elastomeric materials such as; Polydimethylsiloxane (PDMS), Silicone rubbers, Fluorosilicone rubbers, Fluoroelastomers, Perfluoroelastomers, Ethylene Vinyl Acetate (EVA) Thermoplastic Elastomers such as Styrene Block copolymers, Thermoplastic polyolefins, Thermoplastic vulcanisates, Thermoplastic Polyurethane (TPU) Thermoplastic Copolyesters, Melt processable rubbers.

The target substrate 14 may, for example, have a thickness ranging from 12.5 µm-2500 µm and may have widths from 10 mm to 10 m. If the Target substrate is elastomeric it may also have a removable backing substrate to improve rigidity during processing.

Next, as illustrated in FIG. 10, at least a portion of the first composite 16 is removed from the growth substrate 2.

The attractive forces between the graphene 12 and the target substrate 14 forming the first composite 16 are greater than the attractive forces between the graphene 12 and the growth substrate 2.

An adhesive may be used to bond the target substrate 14 and the graphene 12 forming the first composite 16. However, for some target substrates 14 no binding/adhesive layer may be required.

For some target substrates 14, a partial softening of the substrate 14 (in the case of a polymeric substrate) using, for example heat, and/or pressure, may be appropriate to increase adhesion between the target substrate 14 and the graphene 12.

Removing the first composite 16 from the growth substrate 2 involves physical separation of the first composite 16 and the growth substrate 2 in a fully dry separation process. For example, the first composite 16 may be removed from the growth substrate 2 by peeling the first composite from the growth substrate 2. The use of fully dry separation process avoids the use of wet chemical etchant that may introduce contaminants that dope the graphene and degrade the quality of the graphene, and the target substrate In this illustrated example, removing the first composite 16 from the growth substrate 2 leaves the growth substrate 2 intact. However, FIG. 3B illustrates an example where a portion 6 of the growth substrate remains attached to the first composite 16.

Referring to FIG. 1A, the graphene 12 may be processed when it is on the growth substrate 2 before a target substrate 14 has been provided on the graphene 2 to form a first composite 16.

The processing may, for example, include patterning, annealing, doping or any other processes that may be incompatible with the material of the target substrate 14. The processing may even include the formation of optical or electronic devices or parts of optical or electronic devices.

As illustrated in FIG. 7, the first composite 16 isolated at FIG. 1C may be used to produce a product 40 such as, for example, an electronic device or an optoelectronic device. The product may be transparent, flexible and stretchable. The product 30 may be used in the manufacture of an apparatus 42.

The FIGS. 1A, 1B and 1C illustrate a generic method. The FIGS. 2A, 2B, 2C; the FIGS. 3A, 3B; the FIGS. 4A, 4B; the FIGS. 5A, 5B, 5C, 5D, 5E, 5F, 5G; and the FIGS. 6A, 6B, 6C, 6D each illustrate a different examples of the generic method. The descriptions given in relation to the generic method are also applicable to each of the examples except where specifically contradicted by the description of the example. The descriptions given in relation to the examples of FIGS. 3A, 3B and 4A, 4B are applicable to the other examples.

The combination of FIG. 1A and FIGS. 2A and 2B schematically illustrate a method of manufacturing a composite 16 comprising a target substrate 14 and graphene 12. This method differs from that illustrated in FIGS. 1A-1C in that a membrane 24 is used to facilitate separation of the first composite 16 from the growth substrate 2.

First, graphene 12 is provided on a growth substrate 2 (FIG. 1A).

Then, as illustrated in FIG. 1B, a target substrate 14 is provided on the graphene 12 to form a first composite 16 comprising the target substrate 14 and graphene 12.

However, in this example removing the first composite 16 from the growth substrate 2 comprises: providing a membrane 24 on the growth substrate 2 to form a second composite 20 comprising the membrane 24 and the growth substrate 2 (FIG. 2A); and removing the first composite 16 from the second composite 20 (FIG. 2B).

The attractive forces between the graphene 12 and the target substrate 14 forming the first composite 16 are greater than the attractive forces between the graphene 12 and the growth substrate 2.

These attractive forces may, for example, be controlled as described with reference to FIGS. 1A-1C.

The attractive forces between the growth substrate 2 and the membrane 24 forming the second composite 20 are greater than the attractive forces between the growth substrate 2 and the graphene 12.

These attractive forces may, for example, be controlled as described with reference to FIGS. 1A-1C.

When the target substrate 14 and the membrane 24 are physically separated, the respective attractive forces are such that the first composite 16 and the second composite 20 physically separate along the interface between the graphene 12 and the growth substrate 2.

The membrane 24 may be flexible. The membrane 14 may, for example, be: Polyethylene Terephthalate (PET), Polyethylene Naphthalate (PEN), Polyimide (PI), Polycarbonate (PC), Polyethylene (PE), Polyurethane (PU), Polymethylmethacrylate (PMMA), Polystyrene (PS).), natural rubbers such as; Polyisoprenes, Polybutadienes, Polychloraprenes, Polyisobutylenes, Nitrile Butadienes and Styrene Butadienes, saturated elastomeric materials such as; Polydimethylsiloxane (PDMS), Silicone rubbers, Fluorosilicone rubbers, Fluoroelastomers, Perfluoroelastomers, Ethylene Vinyl Acetate (EVA) Thermoplastic Elastomers such as Styrene Block copolymers, Thermoplastic polyolefins, Thermoplastic vulcanisates, Thermoplastic Polyurethane (TPU) Thermoplastic Copolyesters, Melt processable rubbers.

The thickness of the membrane 24 may, for example, range from 12.5-2500 µm thickness. The membrane 24 may have widths from 10 mm to 10 m.

FIGS. 3A and 3B schematically illustrate a method of manufacturing a composite 16 comprising a target substrate 14 and graphene 12. This method differs from that illustrated in FIGS. 1A-1C in that a portion or portions 6 of the growth substrate 2 are retained on a surface of the first composite 16.

In this example, the growth substrate 2 is patterned to form isolated regions 6 for removal along with the first composite 16 when the first composite 16 is removed from the growth substrate 2. The isolated regions may be formed by selectively scoring a portion 6 of the growth substrate 2 so that portion 6 is selectively transferred with the graphene 12 when the first composite 16 is removed.

FIGS. 4A and 4B schematically illustrate a method of manufacturing a composite 16 comprising a target substrate 14 and graphene 12. This method differs from that illustrated in FIGS. 1A-1C in that only a portion or portions 18 of the graphene 12 are transferred as part of the first composite 16. Consequently, only a portion of the first composite is removed from the growth substrate 2 as only portions 18 of the graphene 12 are removed.

The transfer of only selected portions 18 of the graphene 12 may be achieved by controlling selectively the adhesion between the target substrate 14 and the graphene and/or controlling the adhesion between the graphene 12 and the growth substrate 2.

Increasing the adhesion between the target substrate 14 and the portion 18 of the graphene 12 and/or decreasing the adhesion between the portion of the graphene 12 and the growth substrate 2 makes it more likely that the portion 18 of the graphene 12 will be transferred with the removal of the target substrate 14.

Decreasing the adhesion between the target substrate 14 and the portion 18 of the graphene 12 and/or increasing the adhesion between the portion of the graphene 12 and the growth substrate 2 makes it less likely that the portion 18 of the graphene 12 will be transferred with the removal of the target substrate 14.

The adhesion between the target substrate 2 and graphene 12 may, for example, be controlled by:
  creating a surface energy pattern on the target substrate 2
  only allowing certain areas of the target substrate 14 to contact the graphene 12
  using an embossed heated roller to adhere the target substrate 14 and the graphene 12
  using an adhesive between the target substrate 14 and the graphene that is activated by heat/pressure and selectively applying heat/pressure where portions 18 of graphene 12 are desired Some materials could be used as adhesion modifiers and selective transfer moderators, low surface energy materials to reduce adhesion: Silicones, Fluoropolymers, Long chain alkanes or, Alkyl silanes, Alkane thiols etc.

Materials to promote adhesion, e.g. selective plasma treatment, selective deposition of adhesion promoters such as tri-ethoxy silane coupling agents, or primers such as silane based primers e.g. Dow Corning 1200 OS.

FIGS. 5A, 5B, 5C, 5D, 5E, 5F and 5G schematically illustrate a method of manufacturing not only a first composite 16 comprising a first target substrate 14 and first graphene 12 (FIG. 5C) but also a further composite 28 comprising a second target substrate 24 and second graphene 22 (FIG. 5F).

This method differs from that illustrated in FIGS. 1A-1C in that the growth substrate has graphene on two-sides (FIG. 5A), in that the second target substrate 24 is used as a membrane to facilitate separation of the first composite 16 from the growth substrate 2 (FIGS. 5B, 5C, 5D) and in that a membrane 30 is used as a membrane to facilitate separation of the further composite 28 (comprising the second target substrate 24 and graphene 22) from the growth substrate 2 (FIGS. 5E, 5F, 5G).

At FIG. 5A, graphene is provided on two sides of a growth substrate 2. This may be achieved using chemical vapour deposition as described above. First graphene 12 is provided on a first surface 11 of the growth substrate 2 and second graphene 22 is provided on a second surface 21 of the growth substrate 2. The first surface 11 and the second surface 21 are on opposing sides of the growth substrate 2.

At FIG. 5B, a first target substrate 14 is provided on the first graphene 12 to form the first composite 16.

A second target substrate 24 is provided on the second graphene 22 to form a third composite 28 comprising the second graphene 22 and the second target substrate 24.

The target substrate 24 functions as the membrane 24 described previously with reference to FIGS. 2A and 2B and the third composite 28 in combination with the growth substrate 2 form the second composite 20.

The first composite 16 is removed from the second composite 20 (FIGS. 5C, 5D). This removes at least a portion of the first composite 16 from the first surface 11 of the growth substrate 2.

At FIG. 5E, a second membrane 30 is provided on the first surface 11 of the growth substrate 2 to form a fourth composite 26 comprising the second membrane 30 and the growth substrate 2.

The third composite 28 is separated from the fourth composite 28 (FIGS. 5F, 5G). At least a portion of the third composite 28 is removed from the second surface 12 of the second growth substrate 2.

As described previously with reference to FIGS. 3A, 3B and 4A, 4B a portion 6 of the growth substrate 2 may be transferred with the third composite 28 and/or only a portion 18 of the graphene 22 may be transferred with the third composite 28.

The first composite 16 provided at FIG. 5C comprises a substrate 14 and graphene 12. The graphene 12 has not been exposed to wet etching. The composite 16 may be flexible or stretchable. The graphene 12 and the first target substrate 14 may or may not be attached using an adhesive.

As illustrated in FIG. 7, the first composite 16 may be used to produce a product 40 such as, for example, an electronic device or an optoelectronic device. The product 30 may be used in the manufacture of an apparatus 42.

The composite 28 provided at FIG. 5F comprises a substrate 24 and graphene 22. The graphene 22 has not been exposed to wet etching. The composite 28 may be flexible or stretchable. The graphene 22 and the second target substrate 24 may or may not be attached using an adhesive.

As illustrated in FIG. 7, the composite 28 may be used produce a product 40 such as, for example, an electronic device or an optoelectronic device. The product 30 may be used in the manufacture of an apparatus 42.

FIGS. 6A, 6B, 6C and 6D illustrate a method similar to that illustrated in FIGS. 5A to 5G. However, this method is performed as a roll-to-roll process.

At FIG. 6A, the growth substrate 2 has been processed and carries the first graphene 11 and the second graphene 22. The first target substrate 14 is provided from a roll (not illustrated)

It is passed through two opposing rollers 40 along with the first target substrate 14 adjacent the first graphene 12 and along with the second target substrate 24 adjacent the second graphene 22. The rollers 40 may apply pressure and/or heat. The first target substrate 14 may be provided from a roll (not illustrated). The second target substrate 24 may be provided from a roll (not illustrated). The result is a composite that comprises the first composite 16 (first graphene 12 and first target substrate 14) in combination with the second composite 20 (growth substrate 2, second graphene 22 and second target substrate 24).

Next, as illustrated at FIG. 6B, the first composite 16 (first graphene 12 and first target substrate 14) is physically separated from the second composite 20 (growth substrate 2, second graphene 22 and second target substrate 24). The first composite 16 may be stored as a roll for sale.

Next, as illustrated at FIG. 6C, the second composite 20 (growth substrate 2, second graphene 22 and second target substrate 24) is passed through two opposing rollers along with a membrane 30 adjacent the first surface of growth substrate 2. The rollers 40 may apply pressure and/or heat. The first membrane 30 may be provided from a roll (not illustrated). The result is a composite that comprises the third composite 28 (second graphene 22 and second target substrate 24) in combination with the fourth composite 26 (growth substrate 2 and membrane 30).

Next, as illustrated at FIG. 6C, the third composite 28 (second graphene 22 and second target substrate 24) is physically separated from the fourth composite 26 (growth substrate 2 and membrane 30). The third composite 28 may be stored as a roll for sale.

In one implementation of this embodiment, the first target substrate 14, the second target substrate 24 and the membrane may be the same material such as, for example, polycarbonate sheets, which are supplied with an adhesive resin coating.

The rollers may be controlled to control the speed (up to meters per minute), temperature (0-140° C. typically) and pressure of the transfer. This allows adhesion to the target substrates to be controlled while retaining the quality of the graphene and removing the possibility of any doping from an etchant.

The growth substrate 2 may be cut around 1 mm inside the edges between FIGS. 6A and 6B, so that the copper is cut. This prevents strip-off when separation occurs.

The separation of composite layers may involve a slow diagonal peel-off or other methods that maintain approximately uniform stress along the line of contact between the separating composites, for instance by control of the substrate tension using friction brakes or particle brakes on each of the wind up rolls for the growth substrate and target substrates. If the first/third composite was gripped along one entire edge then it could be peeled back in a direction square to the edges of the sheet.

The above-described processes may be fully dry processes and the transfer mechanism avoids the introduction of dopants or contaminants associated with an etchant solution. The graphene retains high quality properties therefore making it possible to achieve high quality devices. Large area devices can be fabricated using this technique.

The first target substrate 14 and the second target substrate 24 of the respective composites 16, 28 may be dissolvable in-situ to leave behind graphene.—For instance they may consist of polymeric materials that can be dissolved in a solvent in which the graphene is insoluble, or they may have a layer of said polymeric material which dissolves to release the graphene.

The different materials that are used to form the described composites may have any number or combination of intervening materials (including no intervening materials).

As used here 'module' refers to a unit or apparatus that excludes certain parts/components that would be added by an end manufacturer or a user. The composites 16, 28 may be modules.

Although embodiments of the present invention have been described in the preceding paragraphs with reference to various examples, it should be appreciated that modifications to the examples given can be made without departing from the scope of the invention as claimed.

In FIG. 5D, it is possible that the third composite 28 comprising the target substrate 24 and the at least a portion of the graphene layer 22 is removed from the growth substrate 2 leaving only the growth substrate. The extra membrane 30 is not then required.

In FIG. 6C, it is possible that there is also another alternative implementation that does not require the extra membrane 30, for instance if the growth substrate 2 is a continuous metal foil, both the first composite 16 and the third composite 28 can be removed simultaneously from the growth substrate 2.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
providing graphene on a growth substrate;
providing a target substrate on the graphene to form a first composite comprising the target substrate and graphene; and
removing at least a portion of the first composite from the growth substrate;
wherein removing the first composite from the growth substrate comprises:
providing a membrane on the growth substrate to form a second composite comprising the membrane and the growth substrate; and
removing at least a portion of the first composite from the second composite,
wherein the attractive forces between the graphene and the target substrate forming the first composite are greater than the attractive forces between the graphene and the growth substrate and wherein the attractive forces between the growth substrate and the membrane forming the second composite are greater than the attractive forces between the growth substrate and the graphene, such that when the target substrate and the membrane are separated, at least a portion of the first composite and the second composite separate.

2. A method as claimed in claim 1, wherein removing the first composite from the growth substrate involves physical separation of the first composite and the growth substrate.

3. A method as claimed in claim 1, wherein removing the first composite from the growth substrate involves peeling the first composite from the growth substrate.

4. A method as claimed in claim 1, wherein removing the first composite from the growth substrate involves a fully dry separation process.

5. A method as claimed in claim 1, wherein removing the first composite from the growth substrate leaves the growth substrate intact.

6. A method as claimed in claim 1, wherein the growth substrate is patterned to form isolated regions for removal along with the first composite when the first composite is removed from the growth substrate.

7. A method as claimed in claim 1, wherein the graphene is processed when on the growth substrate before providing a target substrate on the graphene to form a first composite.

8. A method as claimed in claim 1, wherein the target substrate is flexible.

9. A method as claimed in claim 1, wherein removing at least a portion of the first composite from the growth substrate comprises removing the target substrate and portions of the graphene.

10. A method as claimed in claim 1, comprising producing a product using the first composite.

11. A method comprising:
providing graphene on a growth substrate;

providing a target substrate on the graphene to form a first composite comprising the target substrate and graphene; and removing at least a portion of the first composite from the growth substrate, wherein providing graphene on a growth substrate involves providing first graphene on a first surface of the growth substrate and providing second graphene on a second surface of the growth substrate;

wherein providing a target substrate on the graphene to form the first composite involves providing a first target substrate on the first graphene;

wherein removing at least a portion of the first composite from the growth substrate involves removing at least a portion of the first composite from the first surface of the growth substrate;

the method further comprising:

providing a second target substrate on the second graphene to form a second composite;

removing at least a portion of the second composite from the second surface of the growth substrate, wherein a membrane provides the second target substrate and removing the second composite from the growth substrate occurs after removing the first composite from the first surface of the growth substrate and comprises:

providing a second membrane on the first surface of the growth substrate to form a third composite comprising the second membrane and the growth substrate; and removing at least a portion of the second composite from the third composite.

12. A method comprising:

providing graphene on a growth substrate;

providing a target substrate on the graphene to form a first composite comprising the target substrate and graphene; and removing at least a portion of the first composite from the growth substrate, wherein removing the first composite from the growth substrate comprises:

providing a membrane directly on the growth substrate to form a second composite comprising the membrane and the growth substrate; and removing at least a portion of the first composite from the second composite.

\* \* \* \* \*